US012664922B2

(12) United States Patent
Takeshita

(10) Patent No.: US 12,664,922 B2

(45) Date of Patent: Jun. 23, 2026

(54) DISPLAY CONTROL DEVICE, DISPLAY CONTROL METHOD, AND COMPUTER-READABLE STORAGE MEDIUM

(71) Applicant: JVCKENWOOD Corporation, Yokohama (JP)

(72) Inventor: Hiroshi Takeshita, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 102 days.

(21) Appl. No.: 18/744,775

(22) Filed: Jun. 17, 2024

(65) Prior Publication Data

US 2024/0339061 A1 Oct. 10, 2024

Related U.S. Application Data

(63) Continuation of application No. PCT/JP2022/046059, filed on Dec. 14, 2022.

(30) Foreign Application Priority Data

Dec. 23, 2021 (JP) ................................ 2021-209974

(51) Int. Cl.
*G09G 3/20* (2006.01)

(52) U.S. Cl.
CPC ....... *G09G 3/20* (2013.01); *G09G 2320/0613* (2013.01); *G09G 2320/0686* (2013.01); *G09G 2360/16* (2013.01); *G09G 2380/08* (2013.01)

(58) Field of Classification Search
None
See application file for complete search history.

(56) References Cited

U.S. PATENT DOCUMENTS 5,649,025 A * 7/1997 Revankar ................ G06T 7/136 382/270
6,628,833 B1 * 9/2003 Horie .................. H04N 1/4074 382/199

(Continued)

FOREIGN PATENT DOCUMENTS

JP 2007-300184 11/2007
JP 2010160338 A * 7/2010

OTHER PUBLICATIONS

International Search Report and Written Opinion for International Application Serial No. PCT/JP2022/046059 mailed on Feb. 21, 2023, 10 pages.

*Primary Examiner* — Sultana M Zalalee
(74) *Attorney, Agent, or Firm* — Amin, Turocy & Watson, LLP

(57) ABSTRACT

A display control device to which an image signal is supplied from outside includes: a display control unit configured to control a display of a screen image on a display unit in response to the image signal supplied; a comparison unit configured to make a comparison between a peak level of an image signal of a text window portion displayed on the display unit and a peak level of an image signal of an image of an image portion displayed on the display unit; and a luminance control unit configured to, when a result of the comparison indicates that the peak level of the image signal of the image of the image portion is higher than the peak level of the image signal of the text window portion, control an adjustment of a gain in a direction of decreasing a peak level of the whole screen image.

4 Claims, 6 Drawing Sheets

(56) References Cited

U.S. PATENT DOCUMENTS

| | | | | |
|---|---|---|---|---|
| 2005/0104838 | A1* | 5/2005 | Sasaki | G09G 3/3406 345/102 |
| 2013/0182002 | A1* | 7/2013 | Macciola | G06T 3/02 345/589 |
| 2014/0009513 | A1* | 1/2014 | Noutoshi | H04N 21/44008 345/690 |
| 2015/0262014 | A1* | 9/2015 | Iwamura | G16H 50/20 382/128 |
| 2016/0098963 | A1* | 4/2016 | Kim | G09G 3/3406 345/88 |
| 2016/0381273 | A1* | 12/2016 | Honda | H04N 23/76 348/69 |
| 2017/0358064 | A1* | 12/2017 | Hendry | G06T 5/92 |
| 2018/0270512 | A1* | 9/2018 | Tsukagoshi | H04N 21/4884 |
| 2019/0279581 | A1* | 9/2019 | Furuta | G02F 1/13471 |
| 2020/0143751 | A1* | 5/2020 | Byun | G09G 3/3291 |
| 2020/0380686 | A1* | 12/2020 | Schlueter | G06T 5/40 |
| 2021/0329158 | A1* | 10/2021 | Ichikawa | H04N 23/675 |

* cited by examiner

DISPLAY CONTROL DEVICE, DISPLAY CONTROL METHOD, AND COMPUTER-READABLE STORAGE MEDIUM

CROSS-REFERENCE TO RELATED APPLICATIONS

This application is a Continuation of PCT International Application No. PCT/JP2022/046059 filed on Dec. 14, 2022 which claims the benefit of priority from Japanese Patent Application No. 2021-209974 filed on Dec. 23, 2021, the entire contents of both of which are incorporated herein by reference.

BACKGROUND

The present invention relates to a display control device, a display control method, and a computer-readable storage medium.

A technique has been known for a display device that receives RGB luminance signals and displays color images on a display unit, the technique implementing optimum correction of white color temperatures according to white areas in images (see, for example, Japanese Patent Application Publication No. 2007-300184).

For example, in a state where an image, such as an image to be interpreted, is being displayed on a display device, such as an image interpretation device, the image having many dark portions, a bright window, such as a text window, for example, may sometimes be opened. In this case, the level of luminance of the bright window displayed becomes very high and the bright window may be too glaring to the naked eye and difficult to be looked at directly by the naked eye. A technique disclosed in Patent Literature 1 is a technique for optimizing white color temperatures for both small areas and large areas and in not a technique that takes into consideration of glaringness felt by users directly looking. Furthermore, in a case where a bright text window is opened, decreasing luminance of the whole display unit may reduce visibility of an image.

SUMMARY

A display control device according to one aspect of the present disclosure, to which an image signal is supplied from outside, includes: a display control unit configured to control a display of a screen image on a display unit in response to the image signal supplied; a comparison unit configured to make a comparison between a peak level of an image signal of a text window portion displayed on the display unit and a peak level of an image signal of an image of an image portion displayed on the display unit; and a luminance control unit configured to, when a result of the comparison by the comparison unit indicates that the peak level of the image signal of the image of the image portion is higher than the peak level of the image signal of the text window portion, control an adjustment of a gain in a direction of decreasing a peak level of the whole screen image.

A display control method according to another aspect of the present disclosure includes: controlling a display of a screen image on a display unit in response to an image signal supplied; making a comparison between a peak level of an image signal of a text window portion displayed on the display unit and a peak level of an image signal of an image of an image portion displayed on the display unit; and controlling, when a result of the comparison indicates that the peak level of the image signal of the image of the image portion is higher than the peak level of the image signal of the text window portion, an adjustment of a gain in a direction of decreasing a peak level of the whole screen image.

A non-transitory computer-readable storage medium according to still aspect of the present disclosure stores a computer program causing a computer to execute: controlling a display of a screen image on a display unit in response to an image signal supplied; making a comparison between a peak level of an image signal of a text window portion displayed on the display unit and a peak level of an image signal of an image of an image portion displayed on the display unit; and controlling, when a result of the comparison indicates that the peak level of the image signal of the image of the image portion is higher than the peak level of the image signal of the text window portion, an adjustment of a gain in a direction of decreasing a peak level of the whole screen image.

DETAILED DESCRIPTION

An embodiment of a display control device, a display control method, and a computer program according to the present disclosure will hereinafter be described on the basis of the drawings. The present invention is not to be limited by the following embodiment.

First Embodiment

Display Device

Figure 1:
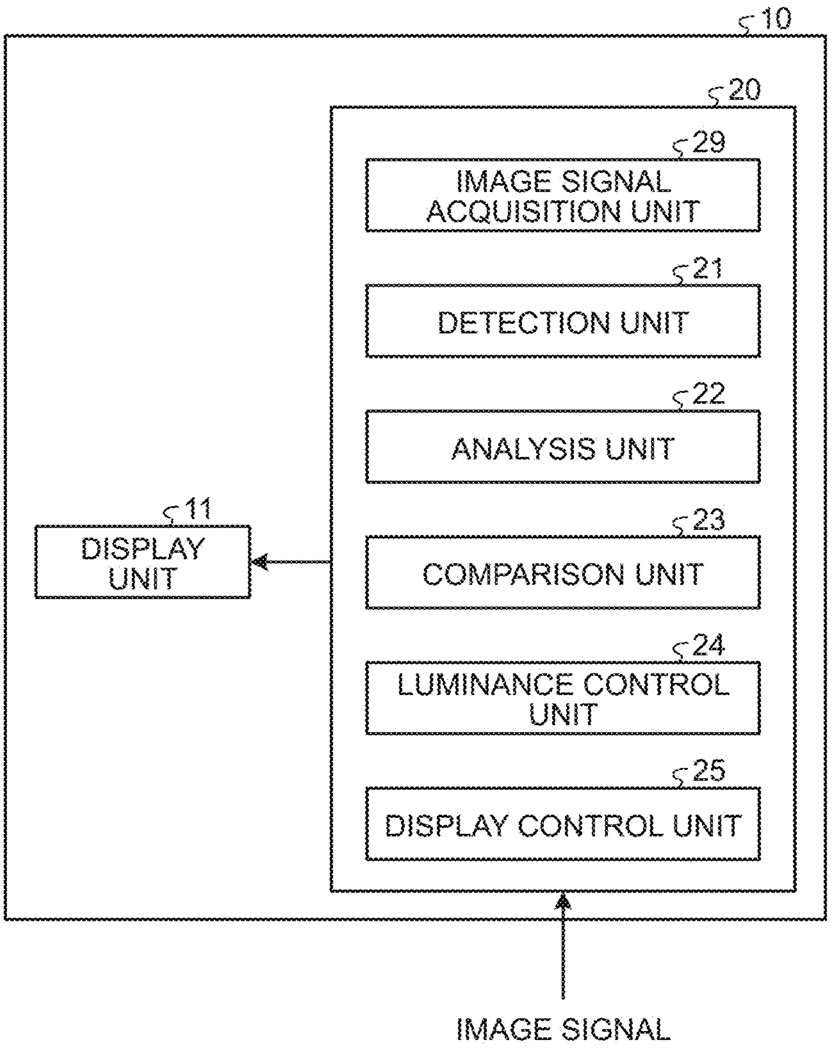
FIG. 1 is a block diagram illustrating an example of a configuration of a display device having a display control device according to a first embodiment.

FIG. 1 is a block diagram illustrating an example of a configuration of a display device 10 having a control unit 20 according to a first embodiment. The display device 10 is a device that displays a screen image including an image and a text window image of a text window portion. The display device 10 displays the screen image by reducing brightness of the text window portion, without changing brightness of the image. For example, the display device 10 is a device for interpretation of the image that is an image to be interpreted, such as an X-ray image or a mammography image. The display device 10 may be, for example, a display device that displays images, such as natural images. With respect to this embodiment, a case where the display device 10 is an image interpretation device and the image is an image to be interpreted will be described as an example.

The text window portion is input via a computer external to the display device 10. The text window portion is a text window displayed on the display device 10 by means of an image signal of the text window image output from the external computer.

An image signal for display of the screen image is supplied to the display device 10 from the outside. For example, the image signal is input to the display device 10 from the external computer connected by a wire or wirelessly. The display device 10 provides a display on the basis of the image signal input from the outside.

The text window portion is a window where text is displayed on a background that is white or substantially white. In this case, the window is in grayscale and is thus achromatic. Display of achromatic colors in gradation of eight bits involves 256 gradation levels from 0 to 255. A window having all of its pixels displayed at the level 255 that is the highest gradation level is called a white window. This display at the level 255 is called a white level. The background being substantially white means, for example, having a background that is an area composed of pixels having a level lower than the level 255, such as the level 254. The white level of the text window portion may be any level not included in the image to be interpreted. The text window portion is a window brighter than the image to be interpreted being displayed on the same screen of a display unit 11. The text window portion is able to be displayed on the display unit 11 in a state of being beside the image to be interpreted or partly overlapping the image to be interpreted.

The display device 10 has the display unit 11 and the control unit (display control device) 20.

The display unit 11 is a device that displays various kinds of information. The display unit 11 is a display including, for example, a liquid crystal display (LCD) or an organic electro-luminescence (EL) display. The display unit 11 displays the screen image on the basis of an image signal input to the display device 10 from the outside. The display unit 11 displays the screen image on the basis of the image signal output via a display control unit 25 of the control unit 20. In this embodiment, the display unit 11 displays the image to be interpreted and the text window portion. The display unit 11 provides the display by reducing the brightness of the text window portion, without changing the brightness of the image to be interpreted.

The control unit 20 is an arithmetic processing device (a control device) including, for example, a central processing unit (CPU). The control unit 20 loads a stored computer program into a memory and executes commands included in the computer program. The control unit 20 includes an internal memory not illustrated in the drawings, and the internal memory is used for temporary storage of data at the control unit 20. The control unit 20 controls a display with the brightness of the text window portion being reduced, without the brightness of the image to be interpreted being changed. The control unit 20 has an image signal acquisition unit 29, a detection unit 21, an analysis unit 22, a comparison unit 23, a luminance control unit 24, and the display control unit 25.

The image signal acquisition unit 29 acquires the image signal of the screen image to be displayed on the display unit 11, from outside the display device 10.

The detection unit 21 detects the text window portion displayed on the display unit 11. More particularly, the detection unit 21 detects pixels corresponding to the text window portion, from the image signal of the screen image output to the display unit 11. In this embodiment, the detection unit 21 detects, as the pixels corresponding to the text window portion, pixels having a white level of 100% from the image signal of the screen image. As described above, this is because the image to be interpreted does not include pixels having the white level of 100% and the pixels having the white level of 100% and included in the screen image are thus those of the text window image of the text window portion. In a case where the image signal is in gradation of 8 bits, for example, the detection unit 21 detects pixels having the level 255 corresponding to the white level of 100%. The detection unit 21 may include pixels close to white in a target to be detected. For example, the detection unit 21 may detect pixels including pixels having a level less than the level 255, such as the level 254. In a case where plural pixels detected as described above form an area having a predetermined area or more, for example, the detection unit 21 detects these pixels as the text window portion.

The analysis unit 22 makes an analysis of a peak level of the image displayed on the display unit 11. The analysis unit 22 makes an analysis of a peak level of an image signal of an image output to the display unit 11. For example, the analysis unit 22 may make an analysis of the peak level by excluding any portion having a high black level and any portion having a high white level from the image signal of the image. A method of making an analysis of the peak level is not limited and any publicly known method may be used.

In a case where the peak level is calculated from a histogram of the screen image including the text window portion at the analysis unit 22, a signal level corresponding to the text window portion is included in the histogram. Precision of detection of the peak level may thereby be reduced. Therefore, detection is preferably performed by excluding the signal level corresponding to the text window portion.

At the analysis unit 22, the peak level of the image may be calculated in consideration of a histogram of a screen image of a time immediately before a time, at which the text window portion is opened.

The comparison unit 23 makes a comparison between a level of the text window portion displayed on the display unit 11 and the peak level of the image displayed on the display unit 11. In this embodiment, the comparison unit 23 makes a comparison between a clip level of the text window portion displayed on the display unit 11 and the peak level of the image displayed on the display unit 11. More particularly, on the basis of a result of the analysis by the analysis unit 22, the comparison unit 23 determines whether or not the clip level of the text window portion displayed on the display unit 11 is equal to or higher than the peak level of the image displayed on the display unit 11.

The text window portion is not necessarily 100% white and includes that of a level of a text window portion having a light gray background other than 100% white and not having been clipped.

According to a result of the comparison by the comparison unit 23, in a case where the peak level of the image is higher than the level of the text window portion, the luminance control unit 24 controls an adjustment of a gain in a direction of decreasing the peak level of the whole image. In this embodiment, according to a result of the comparison by the comparison unit 23, in a case where the peak level of the image is higher than the clip level of the text window portion, the luminance control unit 24 controls an adjustment of the gain in the direction of decreasing the peak level of the whole image.

According to a result of the comparison by the comparison unit 23, in a case where the level of the text window portion is equal to or higher than the peak level of the image, the luminance control unit 24 controls the clip level of the text window portion such that a range up to a level close to the peak level of the image is clipped. In this embodiment, according to a result of the comparison by the comparison unit 23, in a case where the clip level of the text window portion is equal to or higher than the peak level of the image, the luminance control unit 24 controls the clip level of the text window portion such that a range up to a level close to the peak level of the image is clipped.

A predetermined value of the gain is, for example, 1.

In this embodiment, in a case where the clip level of the text window portion is equal to or higher than the peak level of the image, the luminance control unit 24 decreases the clip level of the image signal of the text window portion. The luminance control unit 24 does not change the clip level of the image signal of part other than the text window portion.

As described above, the luminance control unit 24 adjusts the brightness of the pixels of the text window portion on the display unit 11.

The display control unit 25 controls a display of the image and the text window portion on the display unit 11. The display control unit 25 controls the display on the basis of an image signal having a reduced clip level of signal intensity for display of the highest gradation level of the image signal, the reduced clip level having been reduced by the luminance control unit 24. The display control unit 25 thereby implements display with the brightness of the text window portion being reduced and the brightness of the image being maintained as is.

Process at Display Device

Figure 2:
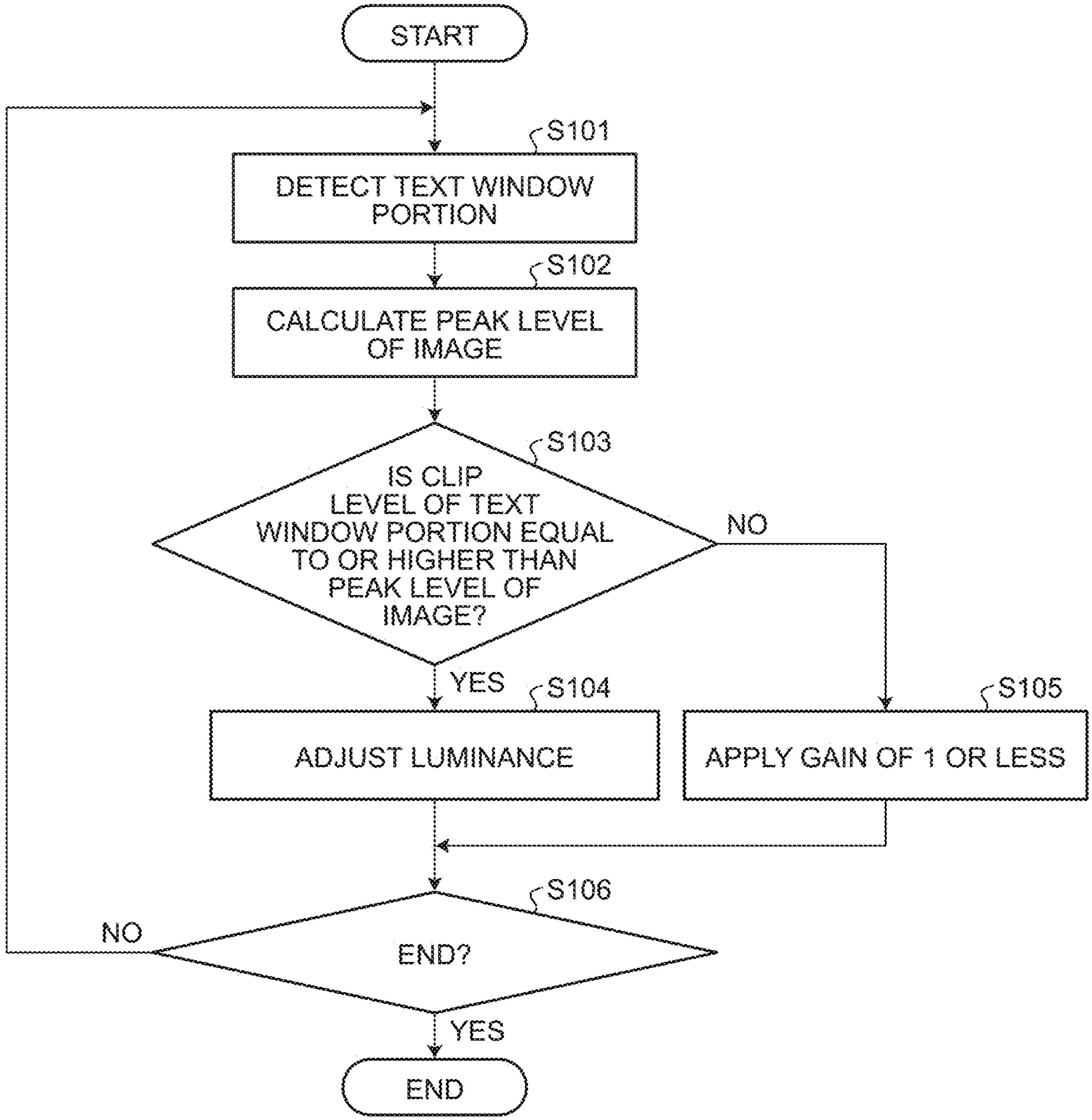
FIG. 2 is a flowchart illustrating an example of a process at the display control device according to the first embodiment.

A process at the display device 10 will be described next by use of FIG. 2. FIG. 2 is a flowchart illustrating an example of a process at the control unit 20 according to the first embodiment. The process of the flowchart illustrated in FIG. 2 is performed after the display device 10 is started and while a process, in which a screen image is displayed on the display unit 11, is being performed.

The control unit 20 detects a text window portion (Step S101). More particularly, the control unit 20 detects, by means of the detection unit 21, pixels corresponding to the text window portion, from an image signal output to the display unit 11. The control unit 20 detects, by means of the detection unit 21, the pixels corresponding to the text window portion, the pixels being pixels having the white level of 100%, from a screen image displayed on the display unit 11. In a case where a plurality of the pixels detected by the detection unit 21 and having the white level of 100% form an area having a predetermined area or larger, the control unit 20 detects these pixels as the text window portion. The control unit 20 then proceeds to Step S102.

The control unit 20 calculates a peak level of an image (Step S102). More particularly, the control unit 20 makes an analysis of, by means of the analysis unit 22, the peak level of the image displayed on the display unit 11. For example, the control unit 20 may make an analysis of, by means of the analysis unit 22, the peak level by excluding any portion having a high black level and any portion having a high white level from an image signal. The control unit 20 then proceeds to Step S103.

The control unit 20 determines whether or not a clip level of the text window portion is equal to or higher than the peak level of the image (Step S103). More particularly, the control unit 20 determines, by means of the comparison unit 23, whether or not the clip level of the text window portion displayed on the display unit 11 is equal to or higher than the peak level of the image displayed on the display unit 11. In a case where the control unit 20 determines that the clip level of the text window portion is equal to or higher than the peak level of the image (Yes at Step S103), the control unit 20 proceeds to Step S104. In a case where the control unit 20 determines that the clip level of the text window portion is not equal to or higher than the peak level of the image (No at Step S103), the control unit 20 proceeds to Step S105.

In a case where the control unit 20 determines that the clip level of the text window portion is equal to or higher than the peak level of the image (Yes at Step S103), the control unit 20 adjusts luminance (Step S104). More particularly, the control unit 20 decreases, by means of the luminance control unit 24, the clip level of the image signal having the white level of 100%, to a level close to the peak level of the image. The control unit 20 then proceeds to Step S106.

In a case where the control unit 20 determines that the clip level of the text window portion is not equal to or higher than the peak level of the image (No at Step S103), the control unit 20 applies a gain of 1 or less (Step S105). More particularly, the control unit 20 applies a gain of 1 or less to the whole screen, by means of the luminance control unit 24. The control unit 20 then proceeds to Step S106.

The control unit 20 determines whether or not the process is to be ended (Step S106). More particularly, for example, in a case where operation to end the process of displaying the screen image has been performed, in a case where operation to change the image displayed has been performed, or in a case where the power of the display device 10 has been turned off, the control unit 20 determines that the process is to be ended. In a case where the control unit 20 determines that the process is to be ended (Yes at Step S106), the control unit 20 ends the process. In a case where the control unit 20 determines that the process is not to be ended (No at Step S106), the control unit 20 executes processing of Step S101 again.

Figure 3:
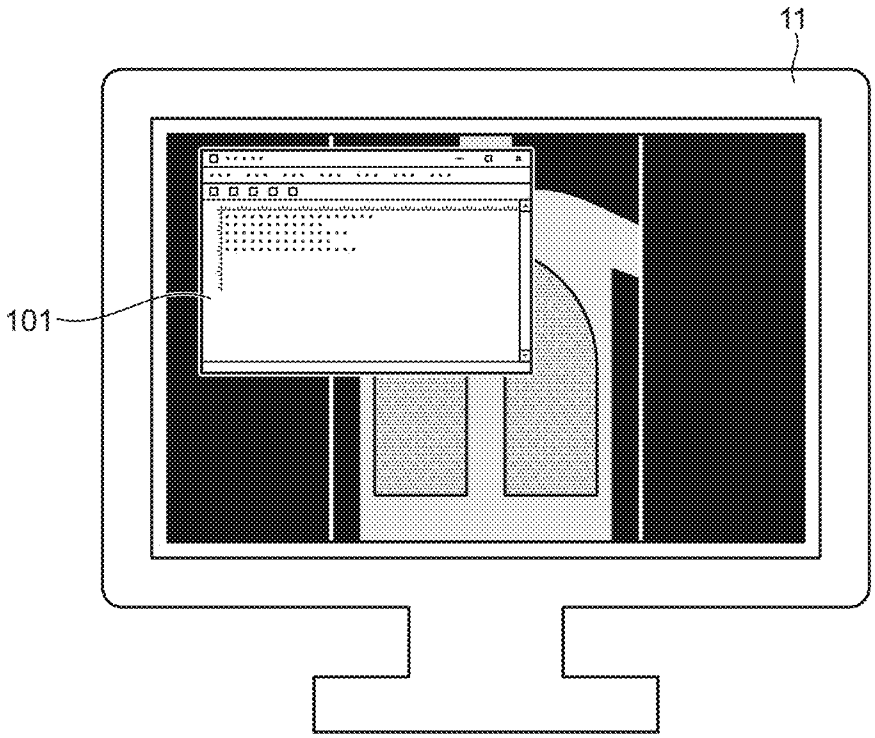
FIG. 3 is a diagram illustrating an example of display on a display unit.
Figure 4:
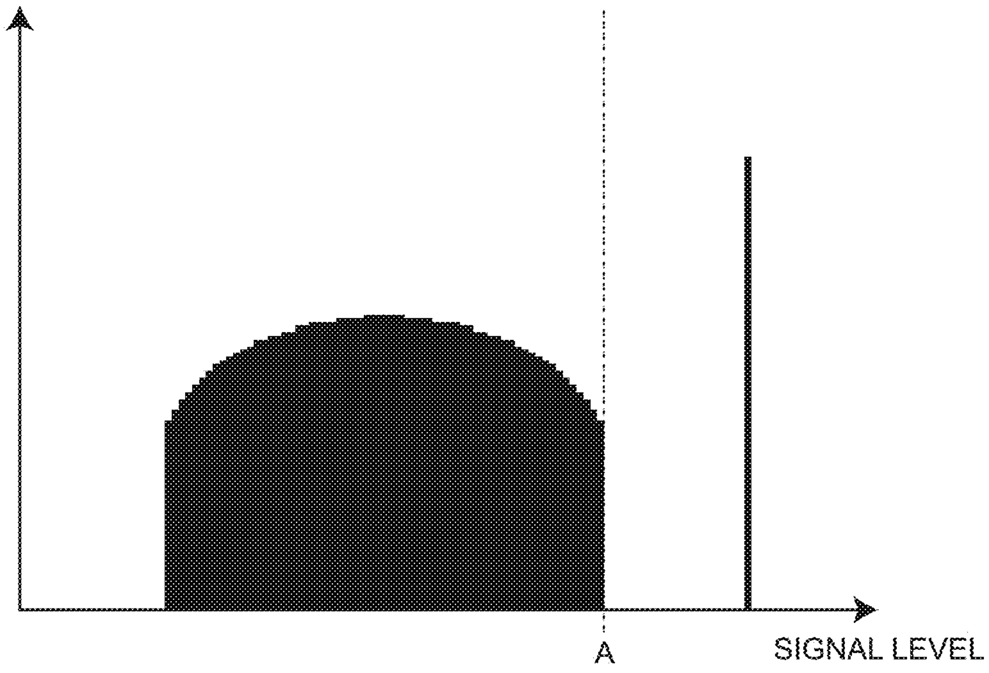
FIG. 4 is a diagram illustrating a histogram of an image illustrated in FIG. 3.
Figure 5:
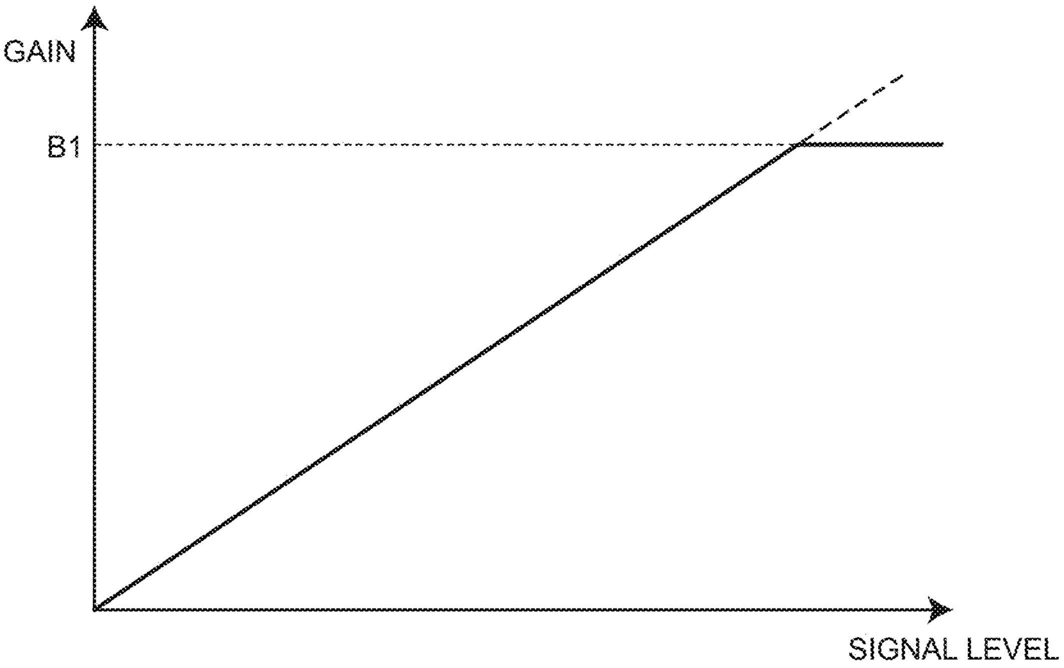
FIG. 5 is a diagram illustrating signal level and gain of the image in FIG. 3.

FIG. 3 is a diagram illustrating an example of display on the display unit 11. FIG. 4 is a diagram illustrating a histogram of an image illustrated in FIG. 3. FIG. 5 is a diagram illustrating signal level and gain of the image in FIG. 3. At Step S102, the peak level of the image is calculated from FIG. 4. At Step S103, whether or not the clip level of the text window portion is equal to or higher than the peak level of the image is determined from FIG. 4 and FIG. 5. In the example illustrated in FIG. 3, a clip level B1 of a text window portion 101 is determined to be equal to or higher than the peak level of the image (Yes at Step S103). In this case, the clip level of the image signal stays as is at the clip level B1.

Figure 6:
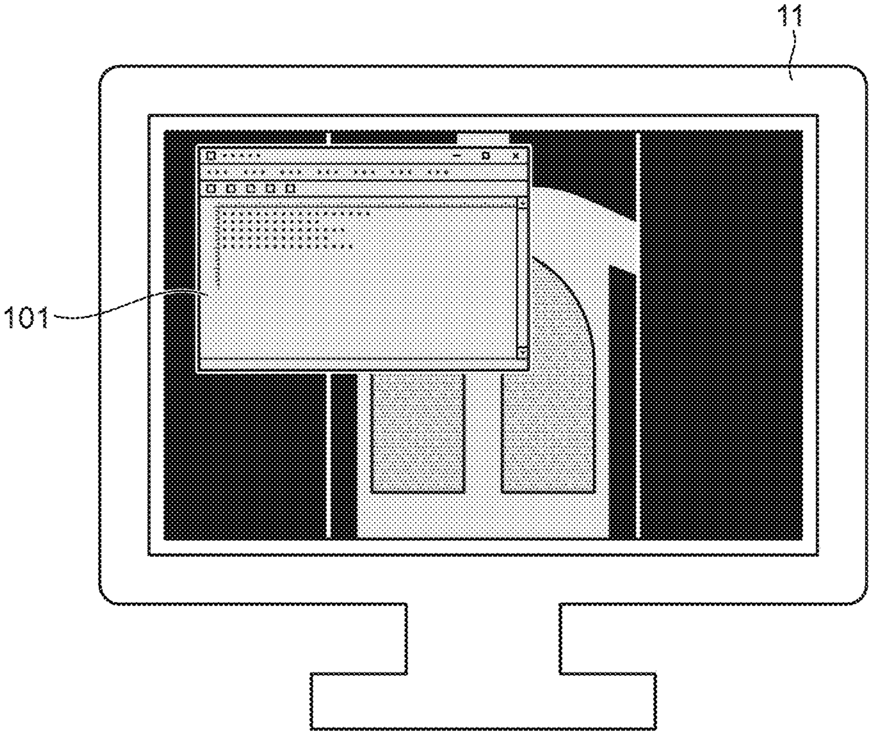
FIG. 6 is a diagram illustrating an example of display on the display unit.
Figure 7:
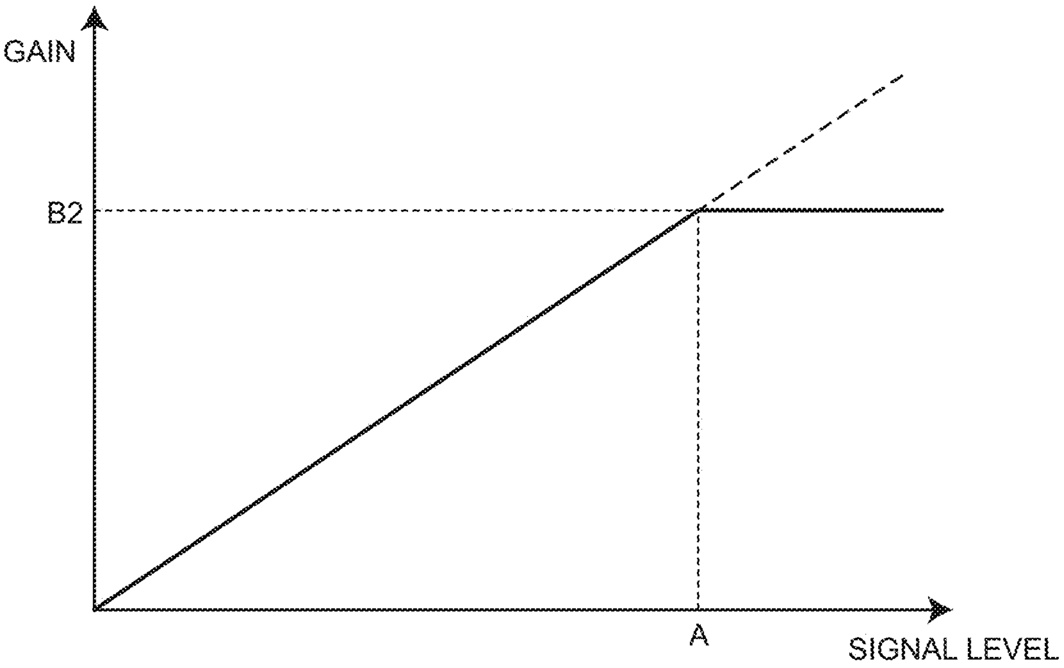
FIG. 7 is a diagram illustrating signal level and gain of an image in FIG. 6.

FIG. 6 is a diagram illustrating an example of display on the display unit 11. FIG. 7 is a diagram illustrating signal level and gain of an image in FIG. 6. The peak level of the image to be interpreted included in the image is the same as that in FIG. 4. At Step S103, whether or not the clip level of the text window portion is equal to or higher than the peak level of the image is determined from FIG. 7. It is assumed herein that a clip level B2 (B2<B1) of the text window portion 101 is determined to be equal to or higher than the peak level of the image (Yes at Step S103). In this case, from the state illustrated in FIG. 3, the brightness of the text window portion 101 is decreased to the clip level B2 as illustrated in FIG. 7 and darkness of the text window portion 101 and darkness of the image to be interpreted are made the same. Brightness of the text window portion 101 illustrated in FIG. 6 is adjusted to be darker than the text window portion 101 illustrated in FIG. 3.

Figure 8:
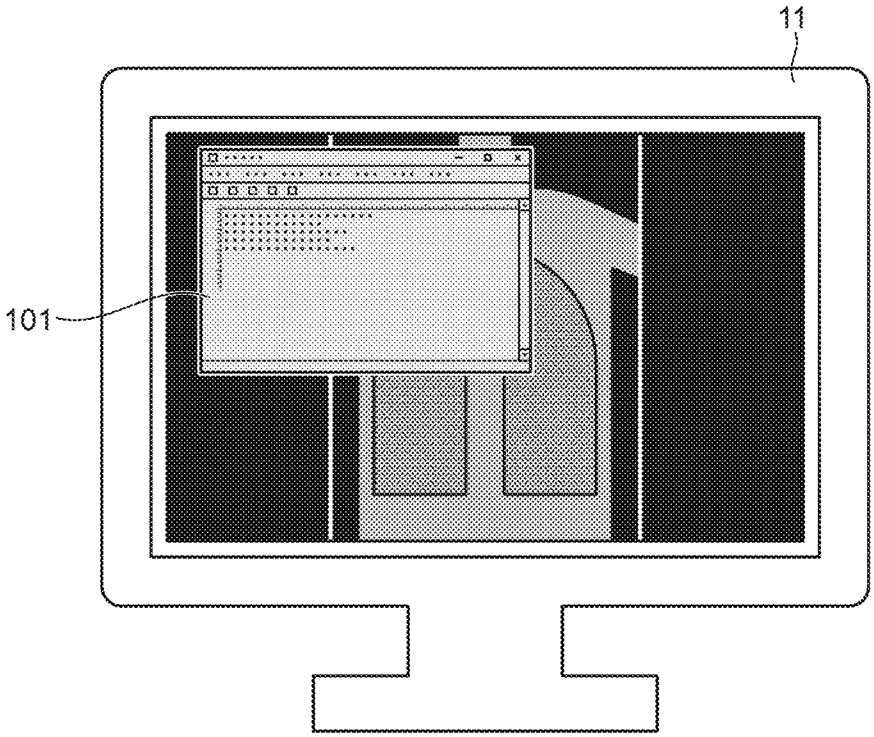
FIG. 8 is a diagram illustrating an example of display on the display unit.
Figure 9:
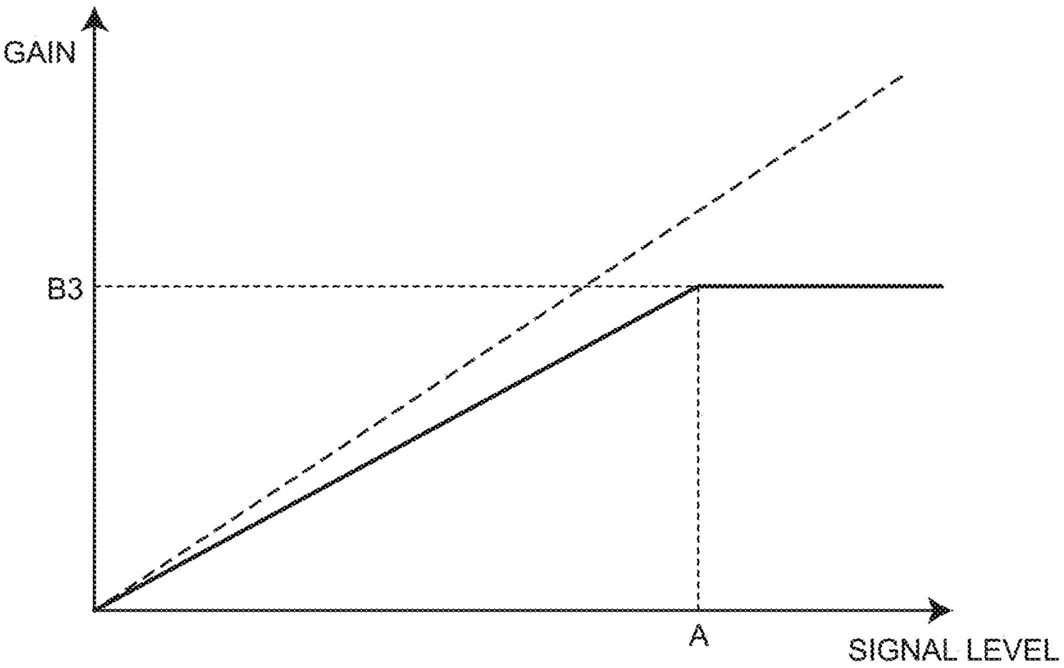
FIG. 9 is a diagram illustrating signal level and gain of an image in FIG. 8.
Figure 10:
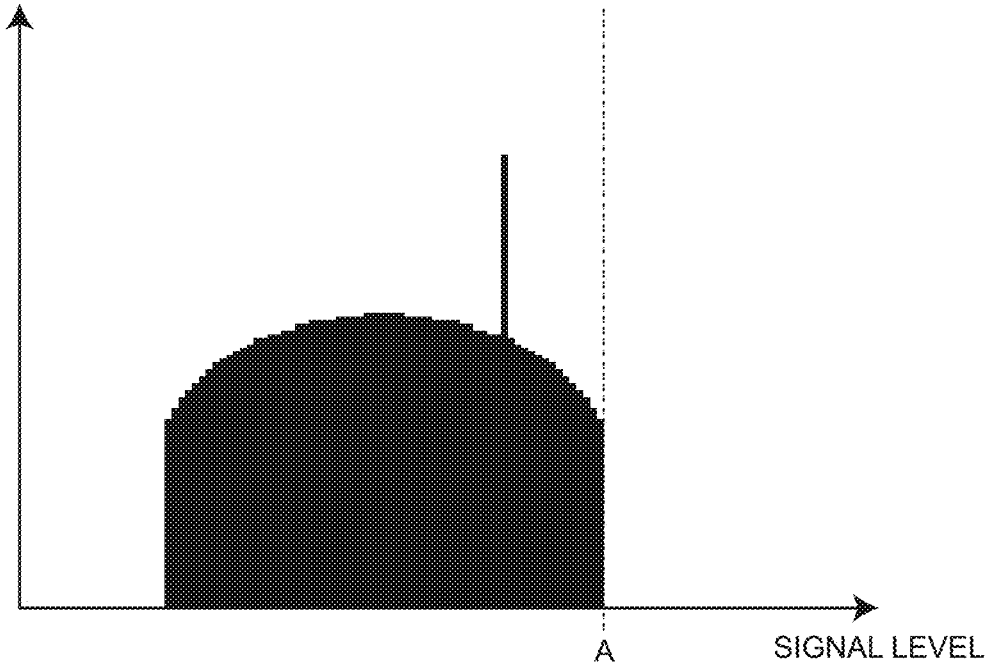
FIG. 10 is a diagram illustrating a histogram of the image illustrated in FIG. 8.

FIG. 8 is a diagram illustrating an example of display on the display unit 11. FIG. 9 is a diagram illustrating signal level and gain of an image in FIG. 8. FIG. 10 is a diagram illustrating a histogram of the image illustrated in FIG. 8. The text window image included in the image has a clip level lower than that in FIG. 4. A value A of signal level where the gradient changes in FIG. 9 is illustrated as a value A of peak level of the histogram in FIG. 4. At Step S103, whether or not the clip level of the text window portion is equal to or higher than the peak level of the image is determined from FIG. 10. It is assumed herein that a clip level B3 (B3<B2) of the text window portion 101 is determined to be less than the peak level of the image (No at Step S103). In this case, a gain of 1 or less is applied to the image signal of the whole screen output to the display unit 11. The clip level of the image signal thereby becomes the clip level B3 and the whole image thereby becomes dark. In the example illustrated in FIG. 8, the whole screen including the image becomes darker than that in the example illustrated in FIG. 6.

Effects

As described above, in a case where the peak level of the image displayed on the display unit 11 is larger than the level of the image signal of the text window portion, this embodiment enables control to adjust the gain in the direction of decreasing the peak level of the whole image. In a case where the image and the text window portion are being displayed on the display unit 11, this embodiment enables minimization of reduction in visibility of the image and enables adjustment of brightness of the text window portion.

The embodiment enables reduction of discomfort felt by glaringness when another window, such as a text window portion high in luminance, is opened while an image is being viewed. Reduction in luminance of the image being viewed is able to be minimized.

Each component of the display device has been functionally and conceptually illustrated in the drawings, and is not necessarily configured physically as illustrated in the drawings. That is, the specific form of each device is not limited to the one illustrated in the drawings, and all or part of each device may be functionally or physically separated or integrated in any units according to, for example, the processing load on the device and the use situation of the device.

The configuration of the display device may be implemented as software by, for example, a computer program loaded into a memory. With respect to the embodiment, functional blocks implemented by cooperation among these pieces of hardware or software have been described above. That is, these functional blocks may be implemented in any of various forms, by hardware only, software only, or a combination of hardware and software.

The above described components include those that are easily anticipated by persons skilled in the art, and those that are substantially the same. Furthermore, the above described configurations may be combined as appropriate. In addition, without departing from the gist of the present invention, various omissions, substitutions, or modifications of the configurations can be made.

The display control device, the display control method, and the computer program according to the present disclosure may be used for, for example, a device for interpreting images, such as X-ray or mammography images to be interpreted, or a display device that displays images, such as natural images.

The present disclosure includes matters contributing to implementation of the goal to "ensure healthy lives and promote well-being for all at all ages" of the Sustainable Development Goals (SDGs) and contributing to value creation through healthcare products and services.

The computer program for implementing the display control method according to the present disclosure may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

According to the present disclosure, reduction in visibility of images is able to be minimized and brightness of text window portions is able to be adjusted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display control device to which an image signal is supplied from outside, the display control device comprising:

at least one memory that stores executable instructions;

at least one processor that executes the executable instructions to perform operations, the operations comprising:

controlling a display of a screen image on a display unit in response to the image signal supplied;

detecting a text window portion displayed on the display unit;

generating a histogram of the screen image in which a signal level corresponding to the text window portion is excluded to analyze a peak level of an image portion;

making a comparison between a level of the text window portion and the peak level of the image portion; and controlling a luminance in a manner that, when the comparison indicates that the level of the text window portion is equal to or higher than the peak level of the image portion, a clip level for a display of the highest gradation level of the text window portion is reduced to a level close to the peak level of the image portion while a brightness of the image portion is not changed, and when the comparison indicates that the level of the text window portion is lower than the peak level of the image portion, a gain of 1 or less is applied to the whole screen image.

2. The display control device according to claim 1, wherein the image displayed in the image portion is an image to be interpreted that does not include any pixels having a level of 255 in gradation of 8 bits corresponding to a white level of 100%.

3. A display control method comprising:

controlling a display of a screen image on a display unit in response to an image signal supplied;

detecting a text window portion displayed on the display unit;

generating a histogram of the screen image in which a signal level corresponding to the text window portion is excluded to analyze a peak level of an image portion;

making a comparison between a level of the text window portion and the peak level of the image portion; and controlling a luminance in a manner that, when the comparison indicates that the level of the text window portion is equal to or higher than the peak level of the image portion, a clip level for a display of the highest gradation level of the text window portion is reduced to a level close to the peak level of the image portion while a brightness of the image portion is not changed, and when the comparison indicates that the level of the text window portion is lower than the peak level of the image portion, a gain of 1 or less is applied to the whole screen image.

4. A non-transitory computer-readable storage medium storing a computer program causing a computer to execute:

controlling a display of a screen image on a display unit in response to an image signal supplied;

detecting a text window portion displayed on the display unit;

generating a histogram of the screen image in which a signal level corresponding to the text window portion is excluded to analyze a peak level of an image portion;

making a comparison between a level of the text window portion and the peak level of the image portion; and controlling a luminance in a manner that, when the comparison indicates that the level of the text window portion is equal to or higher than the peak level of the image portion, a clip level for a display of the highest gradation level of the text window portion is reduced to a level close to the peak level of the image portion while a brightness of the image portion is not changed, and when the comparison indicates that the level of the text window portion is lower than the peak level of the image portion, a gain of 1 or less is applied to the whole screen image.

* * * * *